(12) United States Patent
Bang et al.

(10) Patent No.: US 10,339,853 B2
(45) Date of Patent: Jul. 2, 2019

(54) MOBILE TERMINAL AND METHOD FOR CONTROLLING THE SAME

(71) Applicant: Samsung Display Co., Ltd., Yongin-si (KR)

(72) Inventors: Joo Hyuk Bang, Suwon-si (KR); Chang Wook Kang, Hanam-si (KR); Byung Hyuk Son, Yongin-si (KR); In Ho Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/790,033

(22) Filed: Oct. 22, 2017

(65) Prior Publication Data

US 2018/0130402 A1   May 10, 2018

(30) Foreign Application Priority Data

Nov. 9, 2016 (KR) .................. 10-2016-0148842

(51) Int. Cl.
*G09G 3/20* (2006.01)
*G06K 9/00* (2006.01)
(Continued)

(52) U.S. Cl.
CPC ....... *G09G 3/2092* (2013.01); *G02B 27/0093* (2013.01); *G02B 27/017* (2013.01); *G06K 9/00335* (2013.01); *G06K 9/00348* (2013.01); *G06K 9/00604* (2013.01); *G09G 3/3266* (2013.01); *G09G 3/3291* (2013.01); *G09G 3/3677* (2013.01); *G09G 3/3688* (2013.01); *G02B 2027/014* (2013.01); *G02B 2027/0138* (2013.01); *G02B 2027/0178* (2013.01); (Continued)

(58) Field of Classification Search
None
See application file for complete search history.

(56) References Cited

U.S. PATENT DOCUMENTS

2011/0292041 A1* 12/2011 Lee .................. G09G 3/342
                                                          345/419
2014/0313120 A1   10/2014 Kamhi
(Continued)

FOREIGN PATENT DOCUMENTS

KR   10-2001-0058393   7/2001
KR   10-2005-0082337   8/2005
(Continued)

*Primary Examiner* — Joseph R Haley
(74) *Attorney, Agent, or Firm* — H.C. Park & Associates, PLC

(57) ABSTRACT

A mobile terminal according to an exemplary embodiment includes: a display unit including a display panel including a plurality of pixels, a scan driver including a plurality of stages connected to at least one of the plurality of pixels and supplying a scanning signal, and a data driver configured to supply a data voltage to the plurality of pixels; an eye detecting sensor configured to detect an eye position of a user with respect to the display panel; and a controller configured to generate a control signal that controls the display unit and outputting the control signal, wherein the scan driver is configured to supply a scanning signal from a stage corresponding to one region of the display panel where the eye of the user is directed.

14 Claims, 14 Drawing Sheets

(51) Int. Cl.
*G09G 3/3266* (2016.01)
*G09G 3/3291* (2016.01)
*G09G 3/36* (2006.01)
*G02B 27/01* (2006.01)
*G02B 27/00* (2006.01)
*H04M 1/725* (2006.01)

(52) U.S. Cl.
CPC . *G09G 2310/08* (2013.01); *G09G 2320/0261* (2013.01); *G09G 2320/10* (2013.01); *G09G 2340/0435* (2013.01); *G09G 2354/00* (2013.01); *H04M 1/72525* (2013.01); *H04M 2201/38* (2013.01); *H04M 2250/12* (2013.01)

(56) References Cited

U.S. PATENT DOCUMENTS

2014/0361977 A1* 12/2014 Stafford ............. G02B 27/0093
                                              345/156
2016/0104302 A1   4/2016 Lee et al.

FOREIGN PATENT DOCUMENTS

| KR | 10-2016-0042680 | 4/2016 |
| KR | 10-1634154 | 6/2016 |

* cited by examiner (a)

(b)

(c)

MOBILE TERMINAL AND METHOD FOR CONTROLLING THE SAME

CROSS REFERENCE TO RELATED APPLICATION

This application claims priority from and the benefit of Korean Patent Application No. 10-2016-0148842, filed on Nov. 9, 2016, which is hereby incorporated by reference for all purposes as if fully set forth herein.

BACKGROUND

Field

Exemplary embodiments of the present invention relate to a mobile terminal and a method for controlling the same.

Discussion of the Background

Currently most, mobile terminals are classified as a handheld terminal, a wearable terminal, and a vehicle mounted terminal depending on whether a user may directly carry it or wear it.

These mobile terminals have been developed into multimedia players with complex functions such as photographing of pictures or video, reproduction of songs or video, and receiving of games or broadcasting. To support and increase the functions of a mobile terminal, both the structure of the terminal and software should be considered when developing.

Recently, the demand for a glasses-type mobile terminal, such as smart glasses or a head mounted display (HMD), has increased. The glasses-type mobile terminal is configured to be placed on the head of a human body or worn by a user. The glasses-type mobile terminal may recognize a motion of a user to directly display a processed image for the user's eyes. However, the user may feel dizzy from the image displayed to the glasses-type mobile terminal.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the present invention provide a mobile terminal for recognizing a motion of a user and displaying an image, and a method for controlling the same.

Exemplary embodiments of present invention also provide a mobile terminal for recognizing a gaze of a user and displaying an image, and a method for controlling the same.

Additional features of the invention will be set forth in the description which follows, and in part will be apparent from the description, or may be learned by practice of the invention.

An exemplary embodiment of the present invention discloses a mobile terminal according to an exemplary embodiment includes a display unit including a display panel including a plurality of pixels, a scan driver including a plurality of stages connected to at least one of the plurality of pixels and supplying a scanning signal, and a data driver configured to supply a data voltage to the plurality of pixels; an eye detecting sensor configured to detect an eye position of a user with respect to the display panel; and a controller configured to generate a control signal that controls the display unit and outputting the control signal, wherein the scan driver is configured to supply a scanning signal from a stage corresponding to one region of the display panel where the eye of the user is directed.

An exemplary embodiment of the present invention also discloses a method for controlling a mobile terminal including a display unit. The method including detecting an eye of a user with respect to a display panel of the display unit; determining one region on the display panel where the eye of the user is directed; and generating a control signal that controls the display unit and outputting the control signal so that a scan driver of the display unit supplies a scanning signal from a stage corresponding to the one region. The display unit includes the display panel including a plurality of pixels, the scan driver including a plurality of stages connected to at least one of the plurality of pixels and configured to supply a scanning signal, and a data driver configured to supply a data voltage to the plurality of pixels, including:

Effects of the mobile terminal and the method for controlling the same according to the exemplary embodiments are as follows.

According to the exemplary embodiments, the effect of reducing the time for displaying an image corresponding to the motion of the user may be provided.

Further, according to the exemplary embodiments, the effect of reducing the dizzy feeling of the user who views the image may be provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
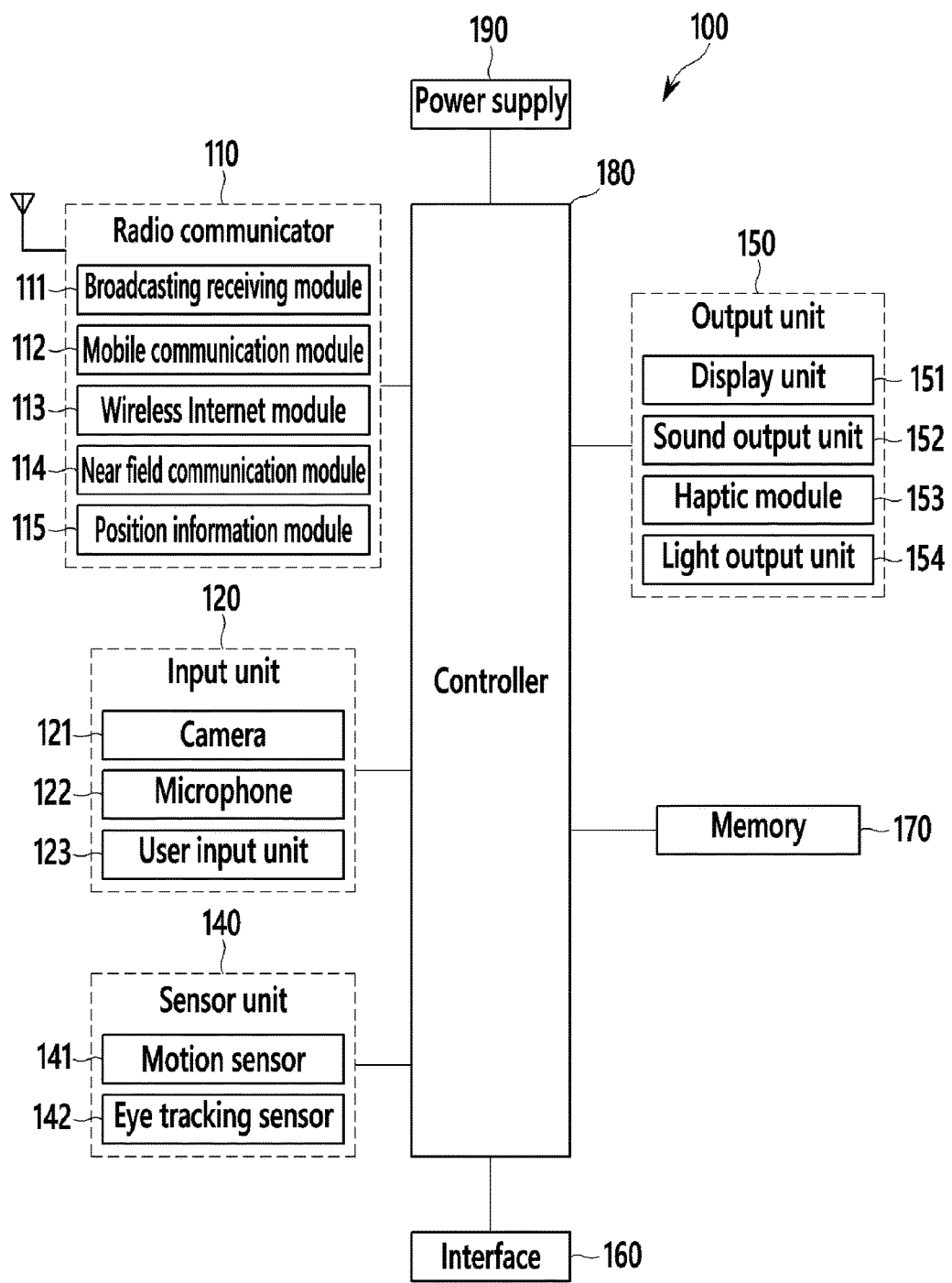
FIG. 1 shows a block diagram of a mobile terminal according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

The mobile terminal described in the present specification may include a mobile phone, a smart phone, a laptop computer, a digital broadcasting terminal, a personal digital assistant (PDA), a portable multimedia player (PMP), a global positioning system (GPS), a slate PC, a tablet PC, an Ultrabook, and a wearable device (e.g., a smart watch, smart glasses, or a head mounted display (HIVID)).

Referring to FIG. 1, a block diagram for describing a mobile terminal according to an exemplary embodiment is shown.

The mobile terminal 100 may include a radio communicator 110, an input unit 120, a sensor unit 140, an output unit 150, an interface 160, a memory 170, a controller 180, and a power supply 190. Constituent elements shown in FIG. 1 are not essential for realization of the mobile terminal, so the mobile terminal described in the present specification may have a greater or lesser number of constituent elements than the above-noted constituent elements.

In detail, among the constituent elements, the radio communicator 110 may include at least one module for allowing a radio communication between the mobile terminal 100 and a radio communication system, between the mobile terminal 100 and another mobile terminal 100, or between the mobile terminal 100 and an external server. Further, the radio communicator 110 may include at least one module for connect the mobile terminal 100 to at least one network.

The radio communicator 110 may include at least one of a broadcasting receiving module 111, a mobile communication module 112, a wireless Internet module 113, a near field communication module 114, and a position information module 115.

The input unit 120 may include a camera 121 or image input unit for inputting an image signal, a microphone 122 or an audio input unit for inputting an audio signal, and a user input unit 123 (e.g., a touch key or a mechanical key) for receiving information from a user. Voice data or image data collected by the input unit 120 may be analyzed and may be processed according to a control command of the user.

The sensor unit 140 may include at least one sensor for sensing at least one of internal information of the mobile terminal, environmental information of the mobile terminal, and user information. For example, the sensor unit 140 may include at least one of a motion sensor 141 including a gravity sensor (i.e., a G-sensor) and a gyroscope sensor, an eye tracking sensor 142, an illumination sensor, a touch sensor, an acceleration sensor, a magnetic sensor, a proximity sensor, an RGB sensor, an infrared sensor (IR sensor), a finger scan sensor, an ultrasonic sensor, an optical sensor (e.g., a camera 121), a microphone 122, a battery gauge, an environment sensor (e.g., a barometer, a hygrometer, a thermometer, a radioactivity sensor, a thermal sensor, or a gas sensor), and a chemical sensor (e.g., an electronic nose, a health care sensor, or a biometric sensor). The mobile terminal disclosed in the present specification may be used by combining pieces of information sensed by at least two of the sensors.

The output unit 150 for generating visual, auditory, or tactile outputs may include at least one of a display unit 151, a sound output unit 152, a haptic module 153, and a light output unit 154. The display unit 151 may form a layered structure with a touch sensor, or may be integrally formed with the same to realize a touch screen. The touch screen may function as a user input unit 123 for providing an input interface between the mobile terminal 100 and the user, and may provide an output interface between the mobile terminal 100 and the user.

The interface 160 may perform a role of forming paths with various types of external devices connected to the mobile terminal 100. The interface 160 may include at least one of a wired/wireless headset port, an external charging port, a wired/wireless data port, a memory card port, a port for connecting a device in which an identification module is provided, an audio input/output (I/O) port, a video input/output (I/O) port, and an earphone port. The mobile terminal 100 may perform appropriate control relating to the connected external device in correspondence to the connection of the external device to the interface 160.

The memory 170 may store data for supporting various functions of the mobile terminal 100. The memory 170 may store a plurality of application programs (or applications) driven at the mobile terminal 100, and data and commands for operating the mobile terminal 100. At least some of the application programs may be downloaded from an external server through radio communication. Further, at least some of the application programs may be provided in the mobile terminal 100 when it is released for basic functions of the mobile terminal 100 (e.g., a call receiving and transmitting function and a message receiving and transmitting function). The application program may be stored in the memory 170, may be installed in the mobile terminal 100, and may be driven so that it may perform an operation (or a function) of the mobile terminal by the controller 180.

The controller 180 may control general operations of the mobile terminal 100 in addition to the operation relating to the application program. The controller 180 may provide or process information or functions suitable for the user by processing signals, data, or information input or output through the above-noted constituent elements or driving the application program stored in the memory 170.

The controller 180 may control at least some of the constituent elements described with reference to FIG. 1 so as to drive the application program stored in the memory 170. The controller 180 may combine at least two of the constituent elements included in the mobile terminal 100, and may operate the same so as to drive the application program.

The power supply 190, controlled by the controller 180, may receive an external power voltage and an internal power voltage and supply the same to the respective constituent elements included in the mobile terminal 100. The power supply 190 may include a battery, and the battery may be a built-in battery or a replaceable battery.

The display unit 151 of the mobile terminal 100 will now be described with reference to FIG. 2

Figure 2:
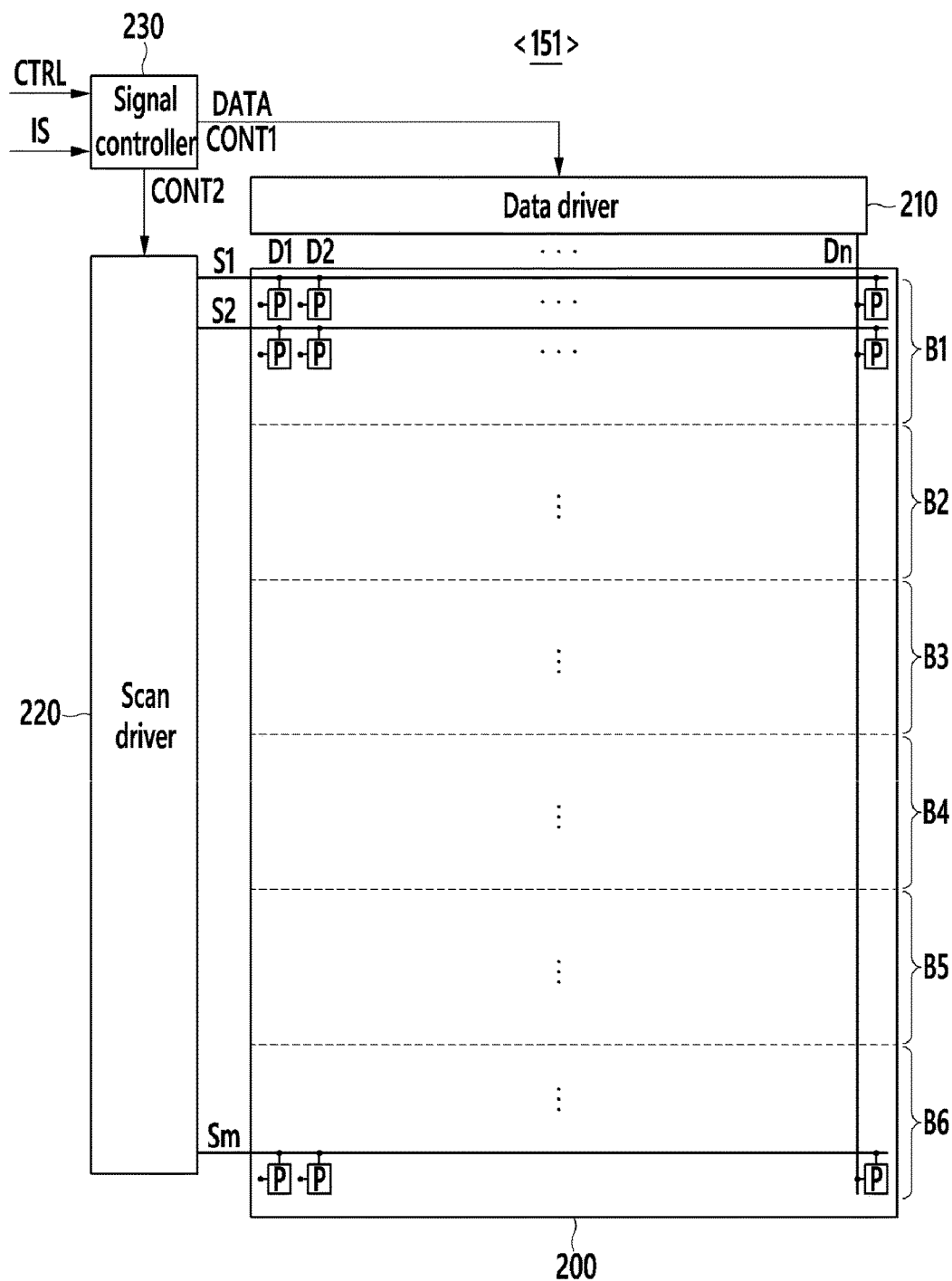
FIG. 2 shows a block diagram of an example of part of a configuration of a display unit of a mobile terminal according to an exemplary embodiment.

FIG. 2 shows a block diagram of an example of part of a configuration of a display unit 151 of a mobile terminal 100 according to an exemplary embodiment. As shown in FIG. 2, the display unit 151 includes a display panel 200, a data driver 210, a scan driver 220, and a signal controller 230. The display unit 151 described in the present specification may have a greater number of constituent elements than the above-described constituent elements.

The display panel 200 may include a plurality of display signal lines and a plurality of pixels (P) connected thereto. The display signal lines may include a plurality of scan lines (S1-Sm) for transmitting a plurality of scanning signals (also referred to as gate signals), and a plurality of data lines (D1-Dn) for transmitting a plurality of data voltages. The pixels (P) may be connected to corresponding scan lines (S1-Sm) and corresponding data lines (D1-Dn), respectively. The pixels (P) may include organic light emitting elements or liquid crystal display elements.

The display panel 200 may be divided into a plurality of blocks (B1-B6). The blocks (B1-B6) may be divided by pixel rows or scan lines. A number of the blocks (B1-B6) will be assumed to be 6 for ease of description.

The data driver 210 may be connected to a plurality of data lines (D1-Dn) of the display panel 200, and applies a plurality of data voltages to the data lines (D1-Dn). In detail, the data driving IC may generate data voltages of all grays by using reference gamma voltages. The data driver 210 may output the generated data voltages to the data lines (D1-Dn) as data signals.

The scan driver 220 may be connected to a plurality of scan lines (S1-Sm), and apply a plurality of scanning signals that are combinations of an enable-level voltage and a disable-level voltage to the scan lines (S1-Sm).

The scan driver 220 may apply a plurality of scanning signals with an enable-level voltage to a plurality of scan lines (S1-Sm) for each horizontal period (which is also written as "1H" and corresponding to one period of a horizontal synchronizing signal and a data enable signal) based on a scan control signal CONT2.

The scan driver 220 may apply the scanning signal to a scan line included in one of the blocks (B1-B6) and then to other scan lines when a one-frame-based image is displayed for one vertical period based on the scan control signal CONT2.

For example, the scan driver 220 may apply the enable-level scanning signal to the scan line included in the second block B2 and then to other scan lines for one vertical period. In another example, the scan driver 220 may apply the enable-level scanning signal to the scan line included in the sixth block B6 and then to other scan lines for one vertical period.

The scan driver 220 may apply the scanning signal to the scan lines in a forward direction or a reverse direction for one vertical period.

For example, the scan driver 220 may apply an enable-level scanning signal to the first scan line S1 and an enable-level scanning signal to the second scan line S1 within one vertical period.

In another example, the scan driver 220 may apply an enable-level scanning signal to the m-th scan line (Sm) and an enable-level scanning signal to the (m−1)-th scan line (Sm−1).

The data driver 210 may be synchronized with respective times for applying a plurality of enable-level scanning signals based on the data control signal CONT1, and apply a plurality of data voltages to a plurality of pixels (P) of the corresponding pixel row.

The signal controller 230 may control the scan driver 220 and the data driver 210.

The signal controller 230 may receive an input image signal (IS) and a control signal (CTRL) from an external device. The input image signal (IS) may include luminance information of the respective pixels of the display panel 200, and the luminance may be divided into a predetermined number of grays, for example, 1024, 256, or 64 grays.

The input control signal (CTRL) may include a vertical synchronization signal, a horizontal synchronizing signal, a main clock signal, and a data enable signal in relation to displaying of images. For example, the data enable signal may have an enable-level voltage for a period in which an image signal (IS) is provided. The main clock signal may be referred to so as to generate at least one clock signal for operating the signal controller 230. The vertical synchronization signal may be referred to so as to distinguish frames of the image, and the horizontal synchronizing signal may be referred to so as to distinguish the pixels arranged along the row of the display panel 200.

The signal controller 230 may process the input image signal (IS) according to an operating condition of the display panel 200 based on the input image signal (IS) and the input control signal (CTRL), and may generate the image data (DATA), the data control signal CONT1, and the scan control signal CONT2.

The signal controller 230 may output the scan control signal CONT2 to the scan driver 220, and may output the data control signal CONT1 and the image data (DATA) to the data driver 210.

The data control signal CONT1 may include a horizontal synchronization start signal, a clock signal, and a line latch signal, and the scan control signal CONT2 may include a vertical start signal, a scanning direction control signal, and a clock signal.

At least some of the respective constituent elements may be operated in cooperation with each other so as to realize an operation and control of the mobile terminal or a control method thereof according to various exemplary embodiments to be described. Further, the operation and control of the mobile terminal, or the control method thereof, may be realized in the mobile terminal by the driving of at least one application program stored in the memory 170.

The scan driver 220 of the display unit 151 will now be described in detail with reference to FIG. 3.

Figure 3:
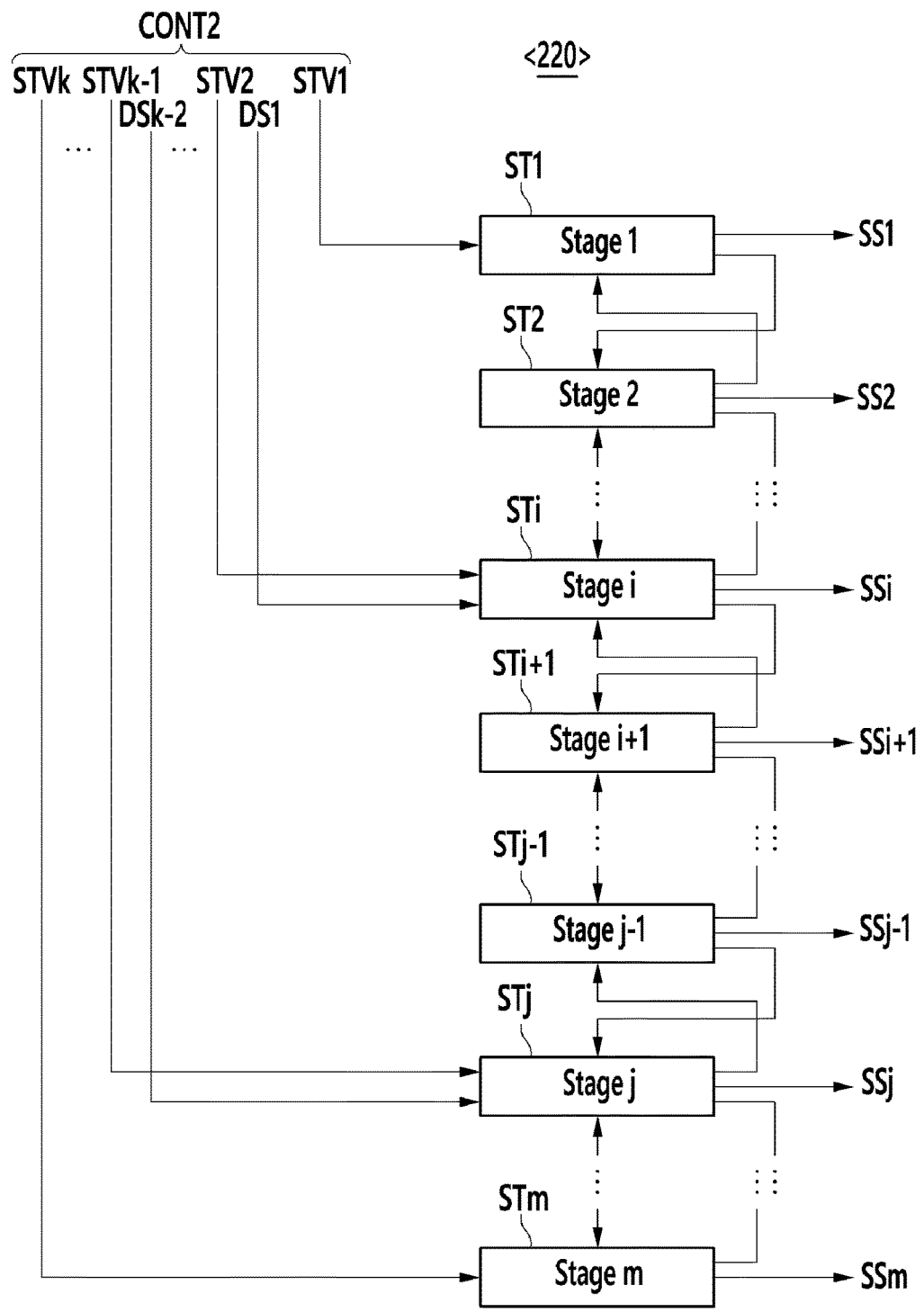
FIG. 3 shows a block diagram of an example of part of a configuration of a display unit of FIG. 2.

FIG. 3 shows a block diagram of an example of part of a configuration of a display unit of FIG. 2. As shown in FIG. 3, the scan driver 220 includes a plurality of stages (ST1-STm) connected to scan lines. At least one of a plurality of stages (ST1-STm) receives at least one of scanning start signals (STV1-STVk) and scanning direction control signals (DS1-DSk−2).

The stages (ST1-STm) may respectively receive scanning start signals (STV1-STVk), an output signal of a previous stage, or an output signal of a next stage corresponding to the clock signals supplied by input lines of clock signals (not shown) to generate a scanning signal and output the same.

For example, the first stage ST1 receives the scanning start signal STV1, generates an enable-level scanning signal SS1, and outputs it to the corresponding scan line. The second stage ST2 receives a scanning signal SS1 of the first stage ST1, generates a scanning signal SS2, and outputs it to the corresponding scan line.

In this instance, a scanning direction of the scan driver 220 may be determined by scanning direction control signals (DS1-DSk−2).

For example, the i-th stage (STi) receives a scanning start signal STV2, generates an enable-level scanning signal (SSi), and outputs it to the corresponding scan line. The i-th stage (STi) transmits an output signal to the (i+1)-th stage (STi+1) when a scanning direction control signal DS1 for instructing the scanning direction to be a forward direction is input. The (i+1)-th stage (STi+1) generates an enable-level scanning signal (SSi+1) and outputs it to the corresponding scan line.

In another example, the j-th stage (STj) receives a scanning start signal (STVk−1), and generates an enable-level scanning signal (SSj) and outputs it to the corresponding scan line. The j-th stage (STj) transmits an output signal to the (j−1)-th stage (STj−1) when a scanning direction control signal (DSk−2) for instructing the scanning direction to be a reverse direction is input. The (j−1)-th stage (STj−1) generates an enable-level scanning signal (SSj−1) and outputs it to the corresponding scan line.

Further, the stage receiving scanning direction control signals (DS1-DSk−2) may stop outputting of scanning signals. The stage receiving the scanning direction control signals (DS1-DSk−2) may also stop transmission of output signals. Accordingly, one vertical period may be terminated.

For example, the j-th stage (STj) receives an output signal from the (j−1)-th stage (STj−1), and receives a scanning direction control signal (DSk−2) for instructing the scanning direction to be a reverse direction. The j-th stage (STj) then does not generate a scanning signal or an output signal to be transmitted to the next stage.

In another example, the i-th stage (STi) receives an output signal from the (i+1)-th stage (STi+1), and receives a scanning direction control signal DS1 for instructing the scanning direction to be a forward direction. The i-th stage (STi) does not generate a scanning signal or an output signal to be transmitted to the previous stage.

It will be described by assuming that the first stage ST1 is included in the first block B1, the i-th stage (STi) is included in the second block B2, and the j-th stage (STj) and the m-th stage (STm) are included in the sixth block B6 from among the stages.

The stages (ST1-STm) may be formed together with pixels (P), and may be mounted on the display panel 200 during a process for forming the pixels (P) on the substrate.

A glasses-type mobile terminal 400 (also referred to as "mobile terminal 400") will now be described with reference to FIG. 4.

Figure 4:
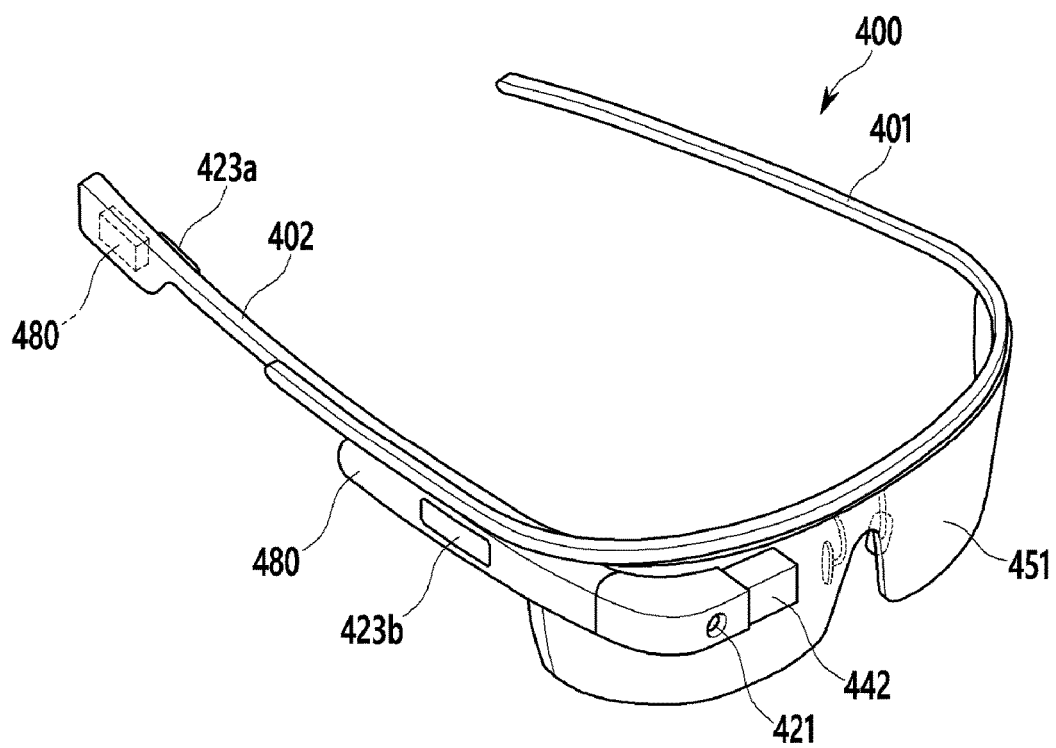
FIG. 4 shows a perspective view of an example of a glasses-type mobile terminal according to an exemplary embodiment.

FIG. 4 shows a perspective view of an example of a glasses-type mobile terminal according to an exemplary embodiment. The mobile terminal 400 is configured to be put on the head of a person, and it may include a frame unit (e.g., a case or a housing) for the configuration thereof. The frame unit may be formed of a flexible material for easy wearing.

The present drawing exemplifies that the frame unit includes a first frame 401 and a second frame 402 that are made of different materials. In general, the mobile terminal 400 may include a characteristic of the mobile terminal 100 of FIG. 1 or a similar characteristic thereof.

The frame unit is supported at the head unit, and provides a space in which various components are installed. As shown, electronic components such as a control module 480 and a sound output module 452 may be mounted on the frame unit.

The control module 480 is configured to control various electronic components provided to the mobile terminal 400. The control module 480 may be understood as a configuration that corresponds to the above-described controller 180. The present drawing exemplifies that the control module 480 is installed in the frame unit of the head unit on one side. However, a position of the control module 480 is not limited to this.

The display unit 451 may be realized in a head mounted display (HMD) form. The HMD form represents a displaying scheme that is mounted on the head unit to directly display the image before eyes of the user. When the user wears the glasses-type mobile terminal 400, the display unit 451 may be disposed to at least one of a right eye and a left eye so as to directly provide the image to the eye of the user.

The image output through the display unit 451 may overlap a general view and may then be seen. The mobile terminal 400 may use such a characteristic of the display to provide augmented reality (AR) that overlaps a virtual image on an image or a background in reality and show them as a single image.

A camera 421 may be disposed near at least one of the right eye and the left eye to photograph the image in the front. The camera 421 may be positioned near the eye, so that the camera 421 may capture the scene viewed by the user as an image.

An eye tracking sensor 442 may be disposed near at least one of the right eye and the left eye to sense a gaze from at least one of the right eye and the left eye of the user.

The glasses-type mobile terminal 400 may include user input units 423a and 423b to be manipulated and receive control instructions. Further, the glasses-type mobile terminal 400 may include a microphone (not shown) for receiving a sound and processing the same into electrical voice data, and a sound output module 452 for outputting a sound.

The user wearing the mobile terminal 400 may view the virtual reality (VR) image of which a viewpoint of the image changes corresponding to a movement or a rotation of the user through the display unit 451. Upon sensing the movement or the rotation of the user, the control module 480 of the mobile terminal 400 may generate an image signal of which the viewpoint is changed and may display the same to the display unit 451. In this instance, latency exists until the image of which the viewpoint has changed is displayed to the display unit 451 after the user moves or rotates. Therefore, the user may feel dizzy because of the latency.

A method for controlling a mobile terminal for improving the problem will now be described with reference to FIG. 5. Further, the reference numerals will be described with reference to the reference numerals used in FIG. 1.

Figure 5:
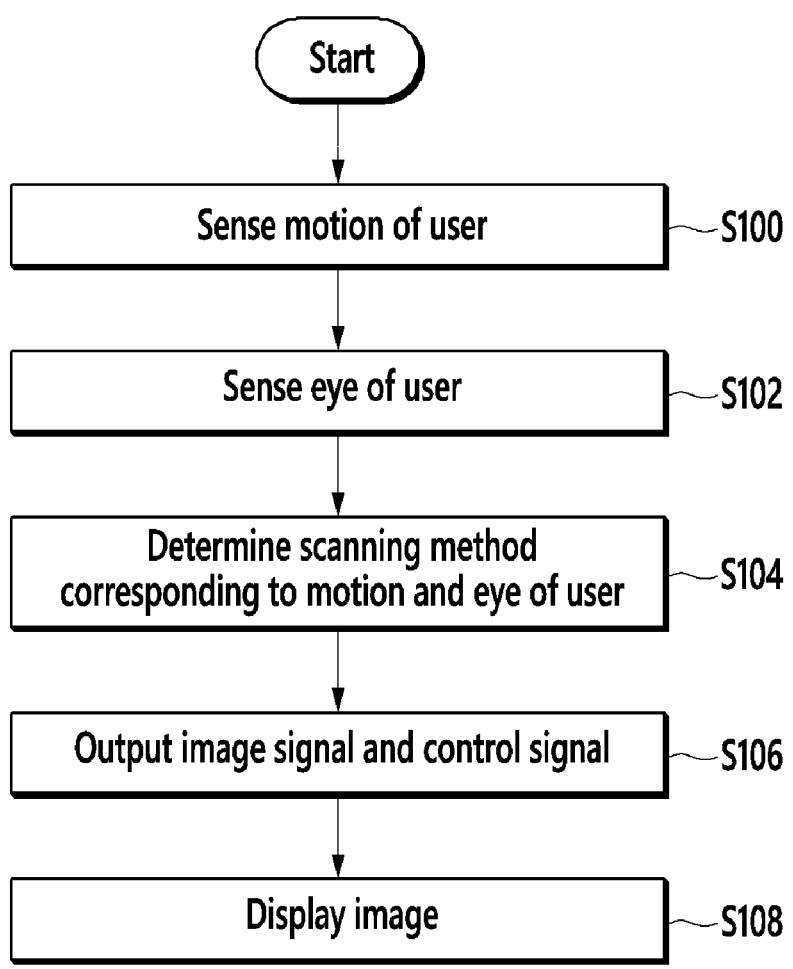
FIG. 5 shows a flowchart of a method for controlling a mobile terminal according to an exemplary embodiment.

FIG. 5 shows a flowchart of a method for controlling a mobile terminal according to an exemplary embodiment.

The motion sensor 141 may sense a motion of the user (S100). The user may move or rotate in a 6-axis direction while wearing the mobile terminal 100. The motion sensor 141 may use at least one of a gravity sensor and a gyroscope sensor to sense the motion of the user.

Upon sensing the motion of the user, the eye tracking sensor 142 may sense the eye position of the user on the display panel 200 (S102). The eye tracking sensor 142 may recognize pupils and irises of the user. The eye tracking sensor 142 may output information on which region of the display panel 200 the eye of the user faces toward on the display panel 200, to the controller 180.

The controller 180 may determine a scanning method of the display unit 151 corresponding to at least one of the motion and the eye position of the user (S104). The controller 180 may determine the scanning method when user motion is sensed and information on the position of the eye of the user is received. The controller 180 may generate a control signal (CTRL) for controlling driving of the scan driver 220 of the display unit 151 according to the determined scanning method.

In detail, the controller 180 may determine the block to which the scanning signal will be applied in one vertical period according to the motion of the user. The controller 180 may determine the block to which the scanning signal will be applied in one vertical period based on a value when the motion of the user starts.

For example, when the user starts rotating and it is determined that the rotation is within a first speed range, the controller 180 determines a number of blocks to which the scanning signal will be applied to be five. In another example, when the user starts rotating and it is determined that the rotation is within a second speed range, the controller 180 may determine the number of blocks to which the scanning signal will be applied to be four. The speed in this instance may be an angular speed when the user rotates.

Upon sensing the motion of the user, the controller 180 may determine the block that the eye of the user is directed to from among a plurality of blocks (B1-B6) by using information on which region of the display panel 200 the eye of the user is directed to.

The controller 180 may determine the scan line at which the scanning signal starts outputting according to the block that the eye of the user is directed to.

For example, when the block that the eye of the user is directed to is a block that is provided on an upper side or a lower side of the display panel 200, the controller 180 may determine the scanning method of the display unit 151 so that the scan line included in the block that the eye of the user is directed to may output the scanning signal and then other scan lines may output the same within one vertical period.

The controller 180 may determine the scanning method of the display unit 151 so as to change the scan line that will start outputting the scanning signal for each one vertical period when the block that the eye of the user is directed to is the block that is provided in the center of the display panel 200.

Further, the controller 180 may determine the scanning direction of the display unit 151 to be the forward direction or the reverse direction according to the block that the eye of the user is directed to.

For example, when the block that the eye of the user is directed to is a block provided on the upper side of the display panel 200, the controller 180 determines the scanning direction of the display unit 151 to be the forward direction. In another example, when the block that the eye of the user is directed to is a block provided on the lower side of the display panel 200, the controller 180 determines the scanning direction of the display unit 151 to be the reverse direction. When the block that the eye of the user is directed to is a block provided in the center of the display panel 200, the controller 180 determines the scanning direction to be changed into the forward direction or the reverse direction for each one vertical period unit.

The controller 180 may output an image signal (IS) and a control signal (CTRL) to the display unit 151 (S106).

The signal controller 230 of the display unit 151 may process the input image signal (IS) and the control signal (CTRL) to display an image to the display panel 200 (S108).

A scanning method of a display unit 151 of a mobile terminal 100 according to an exemplary embodiment will now be described with reference to FIG. 6 to FIG. 9.

Figure 6:
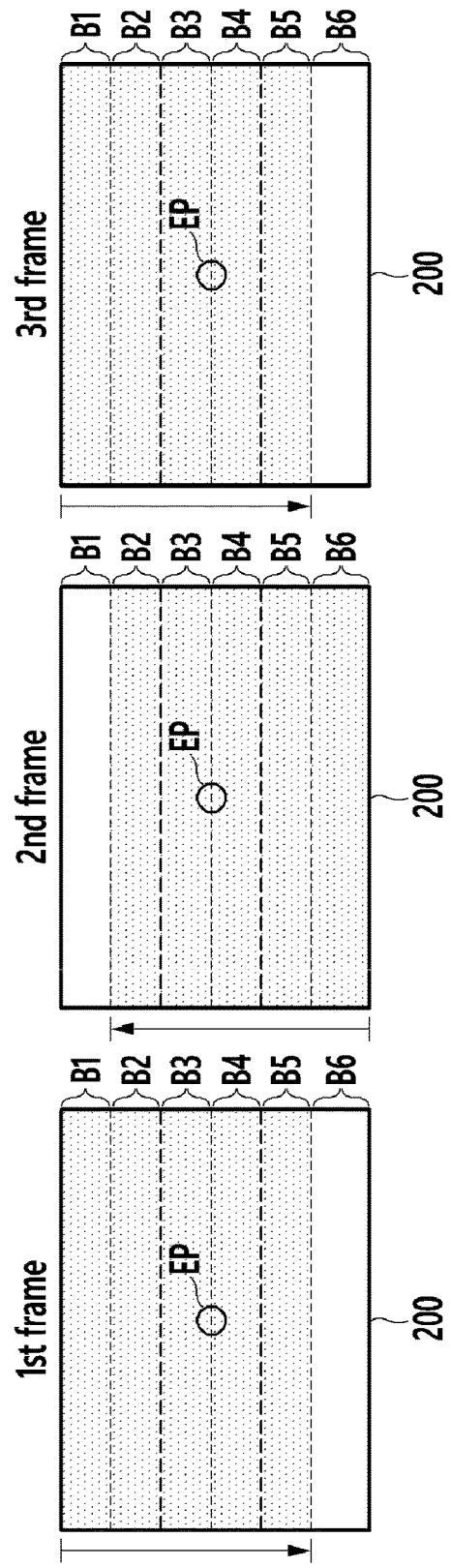
FIG. 6 shows a scanning method of a display unit determined by a control method of FIG. 5 according to an exemplary embodiment.
Figure 7:
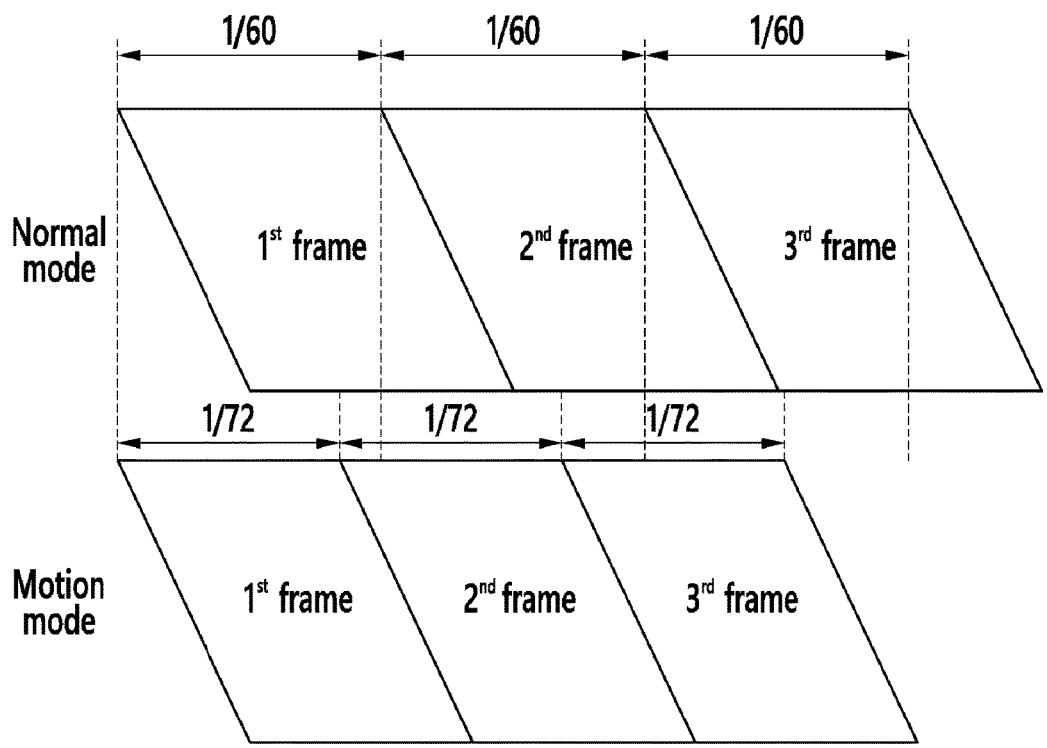
FIG. 7 shows an image frame displayed according to a scanning method of FIG. 5.

FIG. 6 shows a scanning method of a display unit determined by a control method of FIG. 5 according to an exemplary embodiment. FIG. 7 shows an image frame displayed according to a scanning method of FIG. 5.

As shown in FIG. 6, when the motion of the user starts to be sensed by the motion sensor 141, the eye of the user (EP) sensed by the eye tracking sensor 142 may be provided to at least one of center blocks B3 and B4 of the display panel 200.

The controller 180 may determine the block that the eye of the user (EP) is directed to be the center blocks B3 and B4.

The controller 180 may determine the scanning method so as to change the scan line that will start to output the scanning signal for each frame after the frame when the motion of the user is sensed. Further, the controller 180 determines the scanning direction so that the scanning direction may be changed into the forward direction or the reverse direction for each frame. In this instance, the scanning direction may be determined in connection with the position of the scan line at which the scanning signal will start to be output.

The controller 180 may determine the number of blocks to which the scanning signal will be applied according to the motion of the user. The controller 180 may determine the scanning method so that the scanning-direction control signals may be appropriately applied to the respective stages according to the number of blocks to which the scanning signal will be applied.

For example, as shown, the controller 180 determines the scanning method so as to output the scanning signal SS1 from the first stage ST1 included in the first block B1 in the first frame (1st frame) and the third frame (3rd frame), and output the scanning signal (SSm) from the m-th stage (STm) included in the sixth block B6 in the second frame (2nd frame).

The controller 180 may determine the scanning direction so as to output the scanning signal in the forward direction from the first stage ST1 during the first frame (1st frame) and the third frame (3rd frame), and may also determine the scanning direction so as to output the scanning signal in the reverse direction from the m-th stage (STm) during the second frame (2nd frame).

Further, the controller 180 may determine the scanning method so as to apply a scanning direction control signal (DSk–2) for instructing the scanning direction to be the reverse direction to the j-th stage (STj) in the first frame (1st frame) and the third frame (3rd frame). When the output signal of the (j–1)-th stage (STj–1) is transmitted to the j-th stage (STj), the j-th stage (STj) may not output the scanning signal (SSj) by the scanning direction control signal (DSk–2). The controller 180 may determine the scanning method so as to apply the scanning direction control signal DS1 for instructing the scanning direction to be the forward direction to the i-th stage (STi) in the second frame (2nd frame). When the output signal of the (i+1)-th stage (STi+1) is transmitted to the i-th stage (STi), the i-th stage (STi) may not output the scanning signal (SSi) by the scanning direction control signal DS1.

For another example, although not shown, the controller 180 may determine the scanning method so as to output the scanning signal (SS1) in the forward direction from the i-th stage (STi) included in the second block B2 in the first frame (1st frame) and the third frame (3rd frame), and output the scanning signal (SSm) in the reverse direction from the j-th stage (STj) included in the sixth block B6 in the second frame (2nd frame).

By this, the scan driver 220 may output the scanning signal in the forward direction from the block B1 to the block B5 in the first frame (1st frame) from among three consecutive frames while the eye of the user (EP) is directed to at least one of the center blocks B3 and B4 of the display panel 200. In this instance, the scanning signal SS1 may be output from the first scan line S1 of the block B1. No scanning signal is output from the first scan line (Sj) of the block B6.

In the second frame (2nd frame), the scan driver 220 may output the scanning signal in the reverse direction from the block B6 to the block B2. In this instance, the scanning signal (SSm) may be output from the last scan line (Sm) of the block B6. The scanning signal may not be output from the first scan line (Si) of the block B2.

In the third frame (3rd frame), the scan driver 220 may output the scanning signals (SS1-SSj–1) in the forward direction from the block B1 to the block B5. In this instance, the scanning signal SS1 may be output from the first scan line S1 of the block B1.

One frame may be terminated when the scan driver 220 supplies the scanning signal to five blocks from among the six blocks.

As shown in FIG. 7, the display panel 200 may display a one-frame image at 60 Hz in a normal mode. In this instance, the scan driver 220 may output the scanning signal to all blocks (B1-B6) of the display panel 200, that is, all scan lines for one frame period.

According to the scanning method according to an exemplary embodiment, the display panel 200 may display the image to the region except for at least one block in one frame when the motion of the user is sensed. Assuming that the one-frame period is reduced to ⅚ by displaying the image to the region except one block, the display panel 200 may display the image at 72 Hz. The scan driver 220 may output the scanning signal to the scan lines included in the blocks excluding at least one block of the display panel 200 for one reduced frame period.

When a VR image of which time of image changes is displayed to the display unit 451 corresponding to the movement or the rotation of the user, the time until the image is displayed to the display unit 451 after the motion of the user is recognized may be reduced. Therefore, according to an exemplary embodiment, the dizzy feeling of the user who wears the mobile terminal 400 may be reduced.

A scanning method when the eye of the user is directed to the block provided on the upper side or the lower side of the display panel 200 will now be described with reference to FIG. 8 and FIG. 9.

Figure 8:
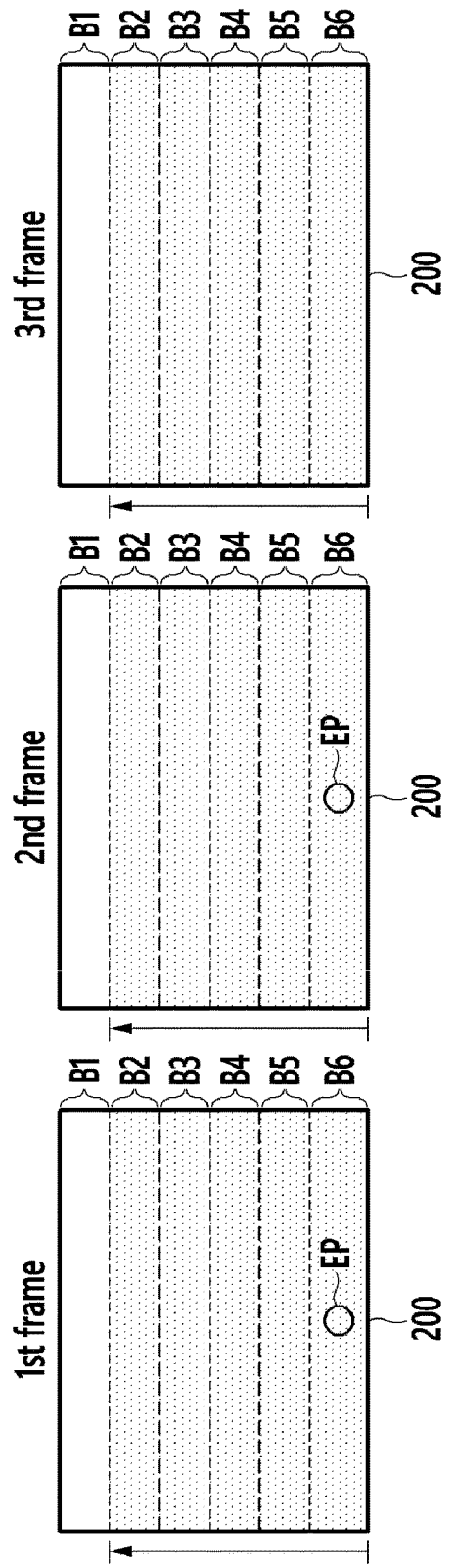
FIG. 8 and FIG. 9 show a scanning method of a display unit by a control method of FIG. 5 according to other exemplary embodiments.
Figure 9:
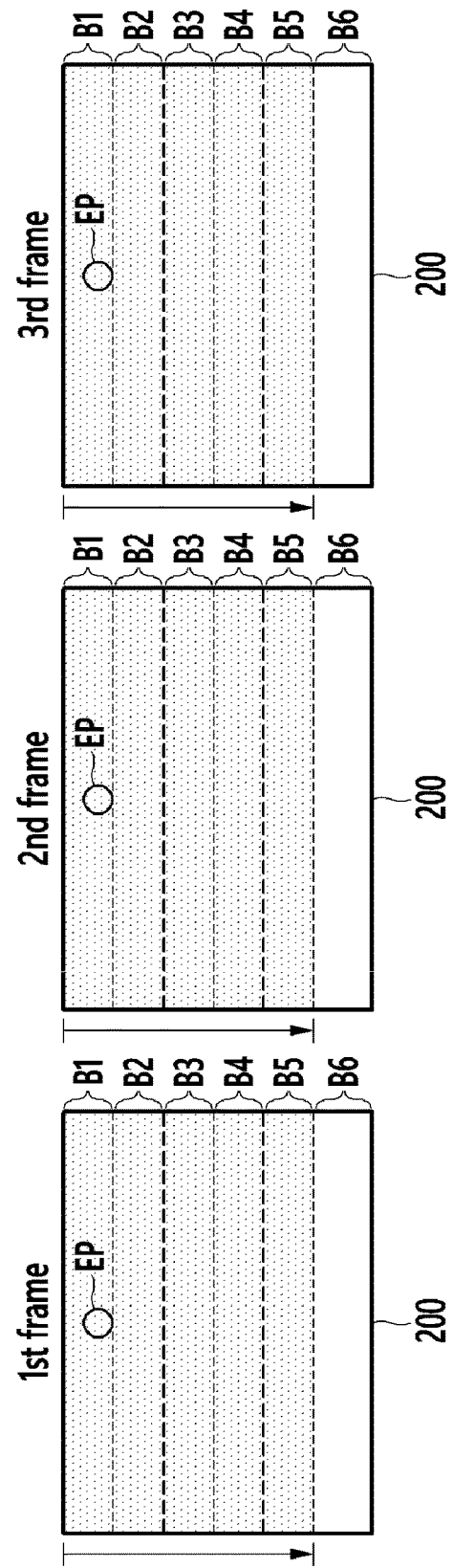

FIG. 8 and FIG. 9 show a scanning method of a display unit by a control method of FIG. 5 according to other exemplary embodiments.

As shown in FIG. 8, when a motion of the user starts being sensed by the motion sensor 141, the eye of the user (EP) sensed by the eye tracking sensor 142 may be directed to at least one of the lower blocks B5 and B6 of the display panel 200.

The controller 180 may determine that the block that the eye of the user (EP) is directed to includes lower blocks B5 and B6.

The controller 180 may determine the scanning method of the display unit 151 so as to output the scanning signal from the scan lines included in the lower blocks B5 and B6 that the eye of the user is directed to in the frame after the motion of the user is sensed. Further, the controller 180 may determine the scanning direction of the display unit 151 to be in a reverse direction (from B6 to B2).

The controller 180 may determine the number of blocks to which the scanning signal will be applied according to the motion of the user. The controller 180 may determine the scanning method according to the number of blocks to which the scanning signal is applied so that the scanning direction control signals may be appropriately applied to the respective stages.

For example, as shown in FIG. 8, the controller 180 may determine the scanning method so as to output the scanning signal (SSm) from the m-th stage (STm) included in the sixth block B6 in the first frame (1st frame) to the third frame (3rd frame).

The controller 180 may determine the scanning direction so as to output the scanning signal in the reverse direction from the m-th stage (STm) during the first frame (1st frame) to the third frame (3rd frame).

Further, the controller 180 may determine the scanning method so as to apply the scanning direction control signal DS1 for instructing the scanning direction to be the forward direction to the i-th stage (STi) in the first frame (1st frame) to the third frame (3rd frame). When the output signal of the (i+1)-th stage (STi+1) is transmitted to the i-th stage (STi), the i-th stage (STi) may not output the scanning signal (SSi) by the scanning direction control signal DS1.

For example, the eye of the user (EP) may be directed to at least one of the lower blocks B5 and B6 of the display panel 200 during the first frame (1st frame) to the third frame (3rd frame).

The scan driver 220 may output the scanning signal in the reverse direction from the block B6 to the block B2 during the first frame (1st frame) to the third frame (3rd frame). In this instance, the scanning signal may be output from the last scan line (Sm) of the block B6.

As shown in FIG. 9, when the motion of the user is sensed, the eye of the user (EP) may be directed to at least one of the upper blocks B1 and B2 of the display panel 200.

When the motion of the user starts being sensed by the motion sensor 141, the eye of the user (EP) sensed by the eye tracking sensor 142 may be directed to at least one of the upper blocks B1 and B2 of the display panel 200.

The controller 180 may determine that the block that the eye of the user (EP) is directed to includes upper blocks B1 and B2.

The controller 180 may determine the scanning method of the display unit 151 so that the scan lines included in the upper blocks B1 and B2 that the eye of the user is directed to may output the scanning signal in the frame after the motion of the user is sensed. Further, the controller 180 may determine the scanning direction of the display unit 151 to be the forward direction (from B1 to B5).

The controller 180 may determine the number of blocks to which the scanning signal will be applied according to the motion of the user. The controller 180 may determine the scanning method according to the number of blocks to which the scanning signal is applied so that the scanning direction control signals may be appropriately applied to the respective stages.

For example, as shown, the controller 180 determines the scanning method so as to output the scanning signal SS1 from the first stage ST1 included in the first block B1 in the first frame (1st frame) to the third frame (3rd frame).

The controller 180 may determine the scanning direction so as to output the scanning signal in the forward direction from the first stage ST1 during the first frame (1st frame) to the third frame (3rd frame).

Further, the controller 180 may determine the scanning method so as to apply the scanning direction control signal (DSk−2) for instructing the scanning direction to be the reverse direction to the j-th stage (STj) in the first frame (1st frame) to the third frame (3rd frame). When the output signal of the (j−1)-th stage (STj−1) is transmitted to the j-th stage (STj), the j-th stage (STj) may not output the scanning signal (SSj) by the scanning direction control signal (DSk−1).

For example, the eye of the user (EP) may be directed to at least one of the upper blocks B1 and B2 of the display panel 200 during the first frame (1st frame) to the third frame (3rd frame).

The scan driver 220 may output the scanning signal in the forward direction from the block B1 to the block B5 during the first frame (1st frame) to the third frame (3rd frame). In this instance, the scanning signal may be output from the first scan line S1 of the block B1.

Therefore, when a VR image of which a viewpoint of the image changes is displayed to the display unit 151 corresponding to the movement or the rotation of the user, the time until the image is displayed to the display unit 151 after the motion of the user is recognized may be reduced. Therefore, according to an exemplary embodiment, the dizzy feeling of the user who wears the mobile terminal 100 may be reduced.

A stage for determining a scanning method of a display unit 151 corresponding to at least one of the user's motion and the eye position of the user will now be described in detail with reference to FIG. 10.

Figure 10:
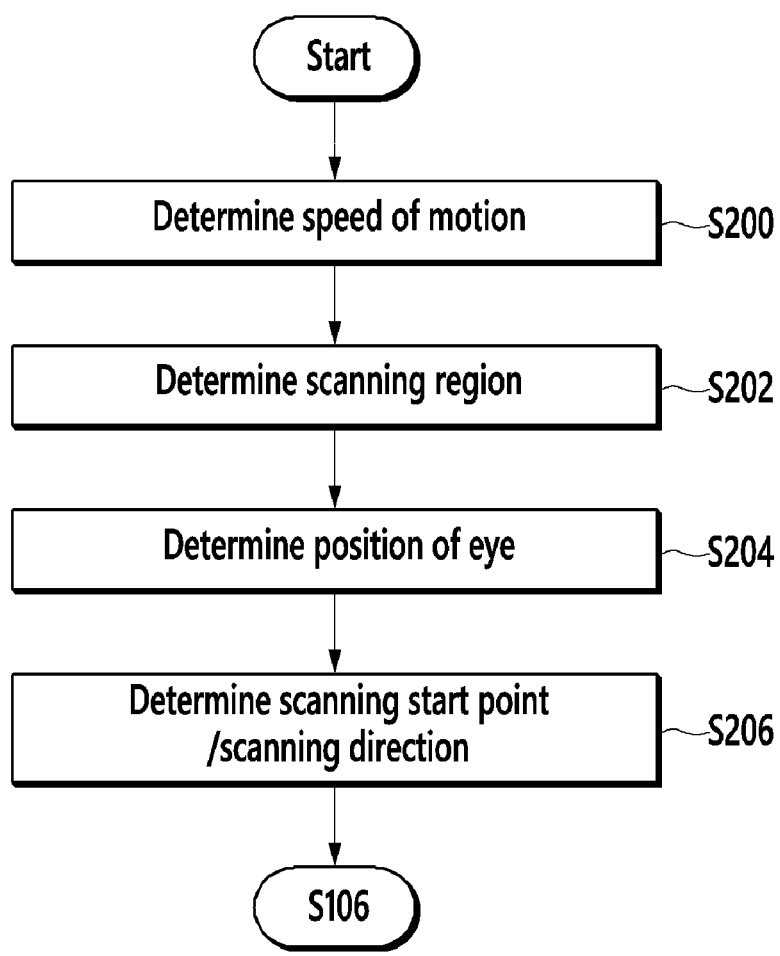
FIG. 10 shows a flowchart of an example of a predetermined stage of a control method of a mobile terminal of FIG. 5.

FIG. 10 shows a flowchart of an example of a predetermined stage of a control method of a mobile terminal of FIG. 5.

The controller 180 may determine a speed of a motion of a user (S200). The controller 180 may determine the blocks to which a scanning signal will be applied within one vertical period according to the determined motion speed (S202). That is, the controller 180 may determine the number of blocks to which the scanning signal will be applied corresponding to the motion speed of the user.

For example, when the user is determined to rotate within a first speed range, the controller 180 determines the number of blocks to which the scanning signal will be applied to be five. When the user is determined to rotate within a second speed range that is greater than the first speed, the controller 180 determines the number of blocks to which the scanning signal will be applied to be four.

The controller 180 may change the number of blocks to which the scanning signal will be applied corresponding to the motion speed of the user, corresponding to each vertical period.

When a motion of the user is sensed, the controller 180 may determine the block that the eye of the user is directed to from among a plurality of blocks (B1-B6) by using information about in which region of the display panel 200 the eye of the user is directed (S204).

The controller 180 may determine the scan line at which an output of the scanning signal will start and the scanning direction of the display unit 151 according to the block where the eye of the user is directed (S206).

For example, when the block that the eye of the user is directed to is the block provided on the upper side or the lower side of the display panel 200, the controller 180 may determine the scanning method of the display unit 151 so as to output the scanning signal from the scan line included in the block that the eye of the user is directed to, within one vertical period. In this instance, the controller 180 may determine the scanning direction of the display unit 151 to be the forward direction when the block that the eye of the user is directed to is the block provided on the upper side of the display panel 200. In another example, the controller 180 may determine the scanning direction of the display unit 151 to be the reverse direction when the block that the eye of the user is directed to is the block provided on the lower side of the display panel 200.

In another example, the controller 180 may determine the scanning method of the display unit 151 so as to change the scan line at which the output of the scanning signal starts for each one vertical period when the block that the eye of the user is directed to is the block provided in a center of the display panel 200. In this instance, the controller 180 may determine the scanning direction so that the scanning direction may be changed to the forward direction or the reverse direction for each one vertical period.

A scanning method of a display unit 151 of a mobile terminal 100 according to a control method of FIG. 10 will now be described with reference to FIG. 11 and FIG. 12.

Figure 11:
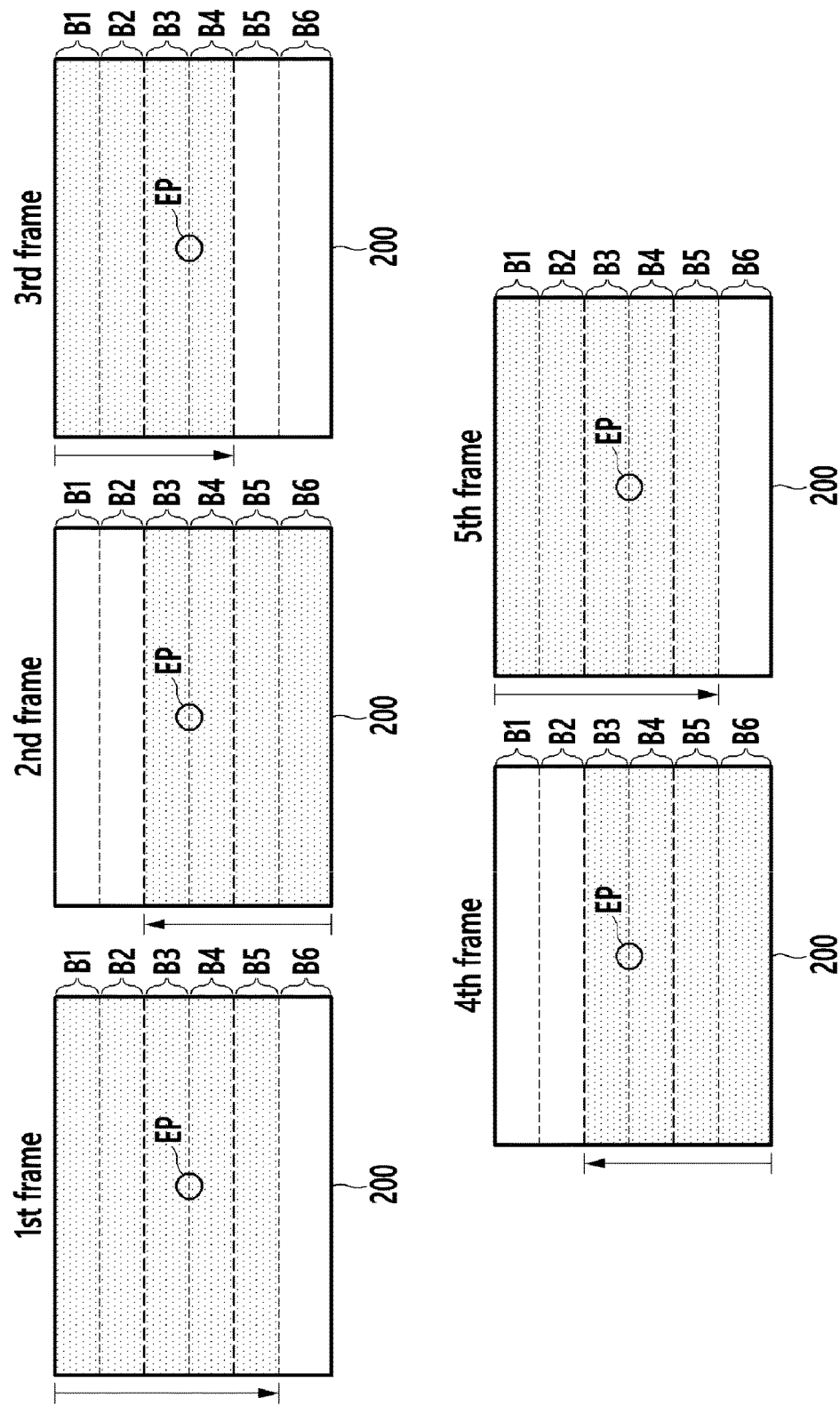
FIG. 11 and FIG. 12 show a scanning method of a display unit determined by a control method of FIG. 10 according to exemplary embodiments.
Figure 12:
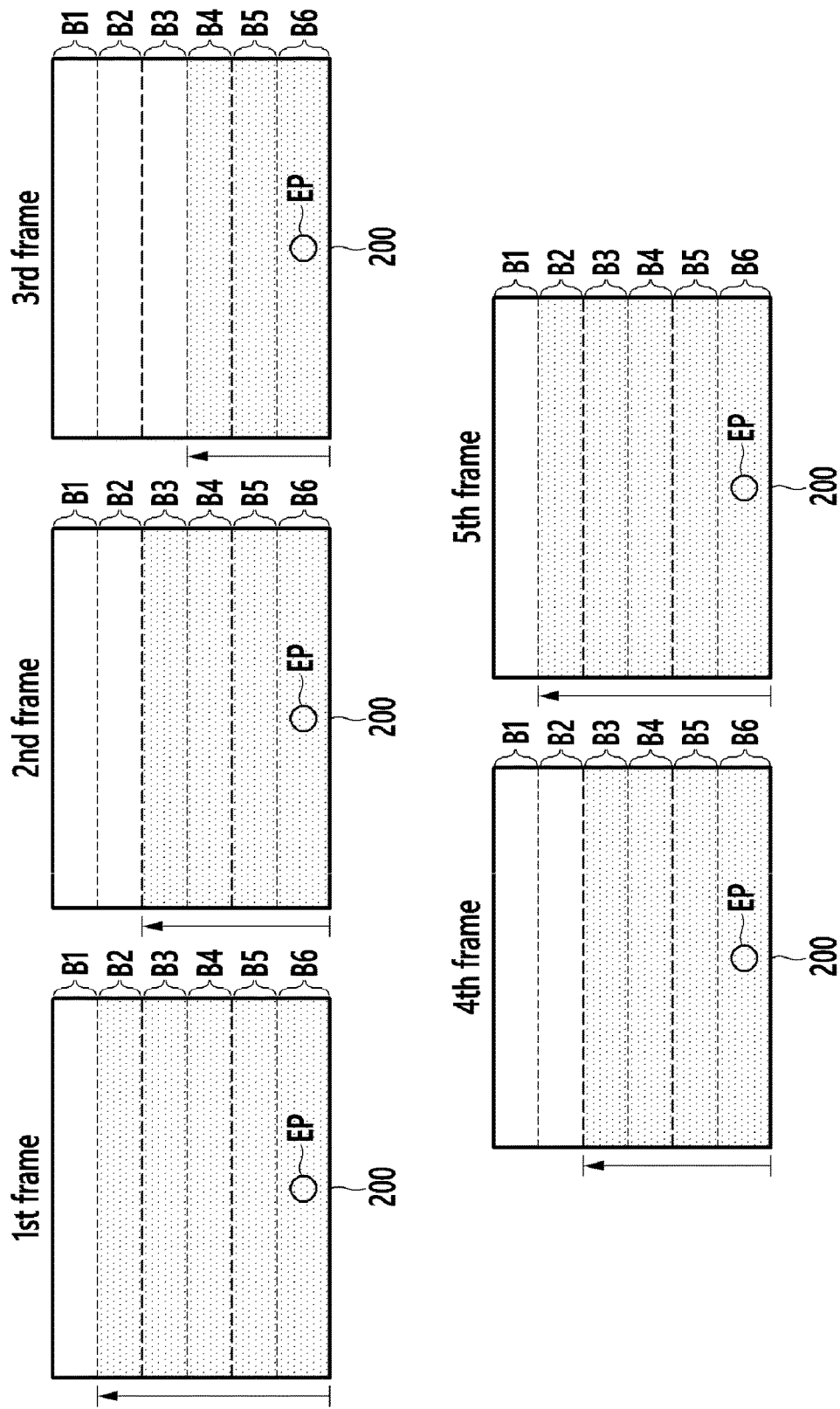

FIG. 11 and FIG. 12 show a scanning method of a display unit determined by a control method of FIG. 10 according to exemplary embodiments.

As shown in FIG. 11, it will be assumed that the motion speed of the user is within a first speed range in the first frame (1st frame) and the fifth frame (5th frame) and it is within a second speed range that is greater than the first speed range in the second frame (2nd frame) to the fourth frame (4th frame).

As shown in FIG. 12, it will be assumed that the motion speed of the user is within a first speed range in the first frame (1st frame) and the fifth frame (5th frame), it is within a second speed range that is greater than the first speed range in the second frame (2nd frame) to the fourth frame (4th frame), and it is within a third speed range that is greater than the second speed range in the third frame (3rd frame).

The controller 180 may determine the number of blocks to which the scanning signal will be applied according to the motion speed of the user.

For example, as shown in FIG. 11, the controller 180 determines the number of blocks to which the scanning signal will be applied to be five because the motion speed of the user is within the first speed range in the first frame (1st frame) and the fifth frame (5th frame). The controller 180 determines the number of blocks to which the scanning signal will be applied to be four because the motion speed of the user is within the second speed range in the second frame (2nd frame) to the fourth frame (4th frame). As shown in FIG. 12, the controller 180 determines the number of blocks to which the scanning signal will be applied to be five because the motion speed of the user is within the first speed range in the first frame (1st frame) and the fifth frame (5th frame). The controller 180 determines the number of blocks to which the scanning signal will be applied to be four because the motion speed of the user is within the second speed range in the second frame (2nd frame) to the fourth frame (4th frame). The controller 180 determines the number of blocks to which the scanning signal will be applied to be three because the motion speed of the user is within a third speed range in the third frame (3rd frame).

The controller 180 may determine the scanning method so as to appropriately apply the scanning direction control signals to the respective stages according to the number of blocks to which the scanning signal will be applied.

As shown in FIG. 11, the controller 180 may determine the block where the eye of the user (EP) is directed to be center blocks B3 and B4. The controller 180 may determine the scanning method so as to change the scan line at which the output of the scanning signal will start for each frame. Further, the controller 180 may determine the scanning direction so as to change the scanning direction to the forward direction or the reverse direction for each frame. In this instance, the scanning direction may be determined in connection with a position of the scan line at which the output of the scanning signal will start.

The controller 180 may determine the scanning method so as to output the scanning signal SS1 from the first stage ST1 included in the first block B1 in the first frame (1st frame), the third frame (3rd frame), and the fifth frame (5th frame), and output the scanning signal (SSm) from the m-th stage (STm) included in the sixth block B6 in the second frame (2nd frame) and the fourth frame (4th frame).

The controller 180 may determine the scanning method so as to output the scanning signal in the forward direction from the first stage ST1 during the first frame (1st frame), the third frame (3rd frame), and the fifth frame (5th frame), and determines the scanning direction so as to output the scanning signal in the reverse direction from the m-th stage (STm) during the second frame (2nd frame) and the fourth frame (4th frame).

Further, the controller 180 may appropriately applies the scanning direction control signals according to the number of determined blocks.

The controller 180 determines the scanning method so as to apply the scanning direction control signal (DSk−2) for instructing the scanning direction to be the reverse direction to the j-th stage (STj) in the first frame (1st frame) and the fifth frame (5th frame). In this case, one frame may be terminated when the scan driver 220 supplies the scanning signal to the five blocks of six blocks.

The controller 180 may determine the scanning method so as to apply the scanning direction control signal for instructing the scanning direction to be the forward direction to a stage (not shown) corresponding to the first scan line of the third block B3 in the second frame (2nd frame) and the fourth frame (4th frame). The controller 180 may determine the scanning method so as to apply the scanning direction control signal for instructing the scanning direction to be the reverse direction to a stage (not shown) corresponding to the first scan line of the fifth block B5 in the third frame (3rd frame). In this case, one frame is terminated when the scan driver 220 supplies the scanning signal to the four blocks of the six blocks.

As shown in FIG. 12, the controller 180 may determine the block that the eye of the user (EP) is directed to be lower blocks B5 and B6. The controller 180 may determine the scanning method of the display unit 151 so as to output the scanning signal from the scan line included in the lower blocks B5 and B6 that the eye of the user is directed to. Further, the controller 180 may determine the scanning direction of the display unit 151 to be the reverse direction.

The controller 180 may determine the scanning method so as to output the scanning signal (SSm) from the m-th stage (STm) included in the sixth block B6 in the first frame (1st frame) to the fifth frame (5th frame).

The controller 180 may determine the scanning direction so as to output the scanning signal in the reverse direction from the m-th stage (STm) during the first frame (1st frame) to the fifth frame (5th frame).

Further, the controller 180 may apply scanning direction control signals according to the number of determined blocks.

The controller 180 may determine the scanning method so as to apply the scanning direction control signal DS1 for instructing the scanning direction to be the forward direction to the i-th stage (STi) corresponding to the first scan line (Si) of the second block B2 in the first frame (1st frame) and the fifth frame (5th frame). In this case, one frame may be terminated when the scan driver 220 supplies the scanning signal to five blocks from among the six blocks.

The controller 180 may determine the scanning method so as to apply the scanning direction control signal for instructing the scanning direction to be the forward direction to a stage (not shown) corresponding to the first scan line of the third block B3 in the second frame (2nd frame) and the fourth frame (4th frame). In this case, one frame may be terminated when the scan driver 220 supplies the scanning signal to four of the six blocks.

The controller 180 may determine the scanning method so as to apply the scanning direction control signal for instructing the scanning direction to be the forward direction to a stage (not shown) corresponding to the first scan line of the fourth block B4 in the third frame (3rd frame). In this case, one frame may be terminated when the scan driver 220 supplies the scanning signal to three of the six blocks.

When a VR image of which time of image changes is displayed to the display unit 151 corresponding to the movement or the rotation of the user, the time until the image is displayed to the display unit 151 after the motion of the user is recognized may be reduced. Therefore, according to an exemplary embodiment, the dizzy feeling of the user who wears the mobile terminal 100 may be reduced.

Another example of a display unit 151 according to an exemplary embodiment will now be described with reference to FIG. 13.

Figure 13:
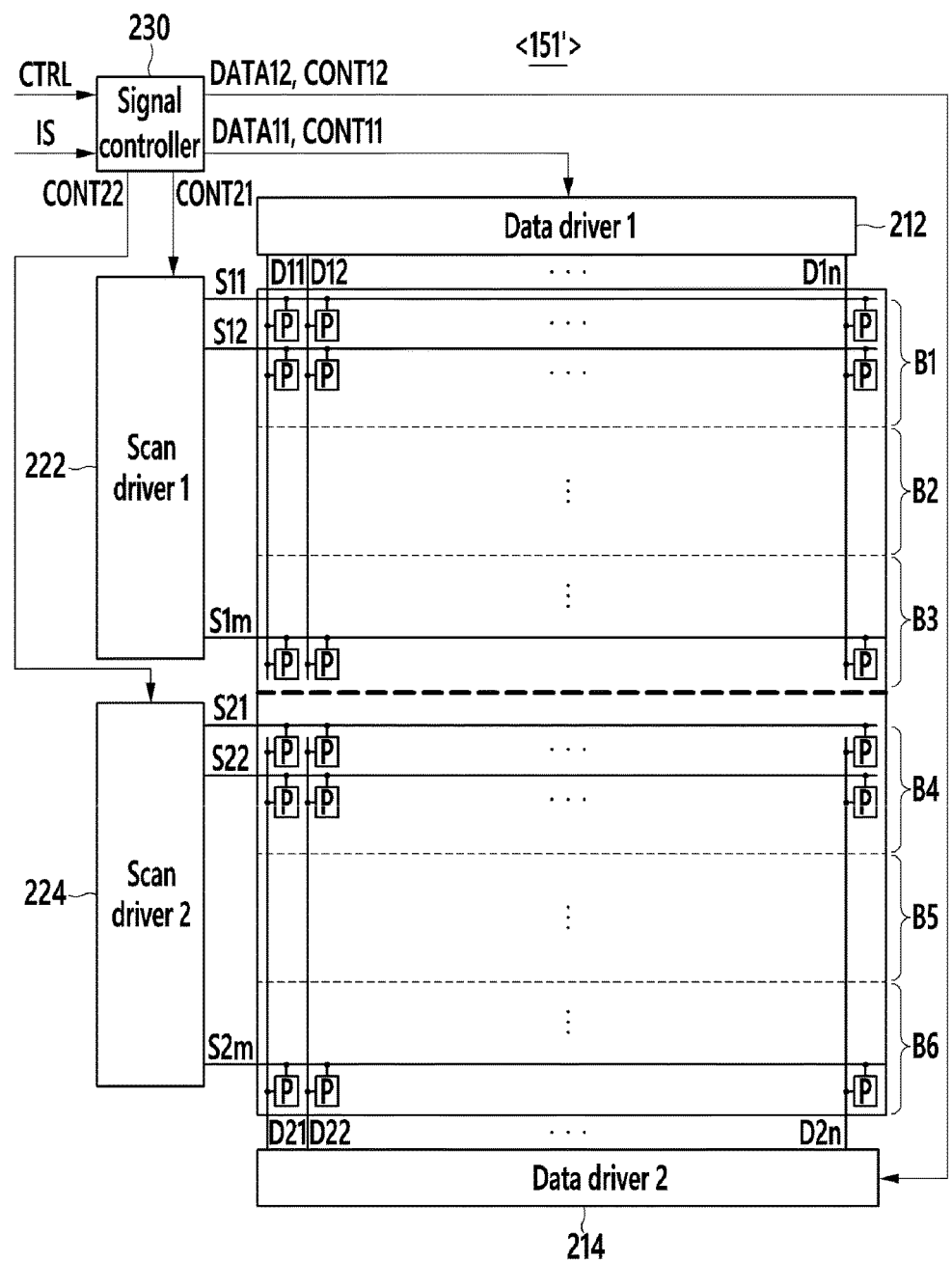
FIG. 13 shows a block diagram of another example of a part of a configuration of a display unit of a mobile terminal according to an exemplary embodiment.

FIG. 13 shows a block diagram of another example of a part of a configuration of a display unit of a mobile terminal according to an exemplary embodiment. Like configurations as those of FIG. 2 from among the configurations shown in FIG. 13 will not be described.

The display unit 151' may include a display panel 200, a first data driver 212, a second data driver 214, a first scan driver 222, a second scan driver 224, and a signal controller 230.

The first data driver 212 may apply a data voltage to pixels provided on some blocks (B1-B3) of a plurality of blocks (B1-B6). The second data driver 214 may apply a data voltage to pixels provided on the rest of the blocks (B4-B6) of the plurality of blocks (B1-B6).

The first data driver 212 may receive image data (DATA1) for pixels of a row according to a data control signal (CONT11), and select a gray voltage corresponding to respective image data (DATA1) from the gray voltage to convert the image data (DATA1) to a data voltage and applies the same to corresponding data lines (D11-D1$n$).

The second data driver 214 may receive image data (DATA2) for pixels of a row according to a data control signal (CONT12), and select a gray voltage corresponding to respective image data (DATA2) from the gray voltage to convert the image data (DATA2) to a data voltage and applies the same to corresponding data lines (D21-D2$n$).

The first scan driver 222 may be connected to the scan lines (S11-S1$m$) included in the first block B1 to the third block B3. The first scan driver 222 may apply a plurality of scanning signals formed with a combination of an enable-level voltage and a disable-level voltage to the scan lines (S11-S1$m$) according to the gate control signal (CONT21).

The second scan driver 224 may be connected to the scan lines (S21-S2$m$) included in the fourth block B4 to the sixth block B6. The second scan driver 224 may apply a plurality of scanning signals formed with a combination of an enable-level voltage and a disable-level voltage to the scan lines (S21-S2$m$) according to the gate control signal (CONT22).

In one vertical period, the first data driver 212 and the second data driver 214 may individually apply the data voltage to the pixel. For example, when the data voltage is applied to the pixel provided on the block B1 connected to the first data driver 212, the data voltage may be supplied to the pixel provided on the block B4 connected to the second data driver 214.

In an exemplary embodiment, two data drivers 212 and 214 are operable, so the time for programming the data voltage of one frame image signal to the display panel 200 is short. Therefore, the display panel 200 may display the image at a higher frequency.

Figure 14:
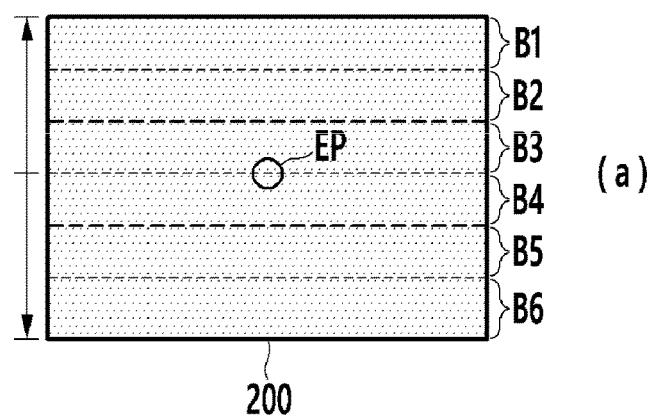
FIG. 14 shows a scanning method of a display unit of FIG. 13 according to various exemplary embodiments.
Figure 14:
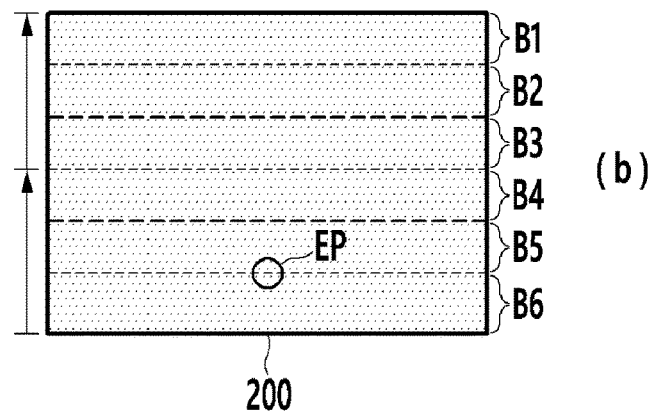
Figure 14:
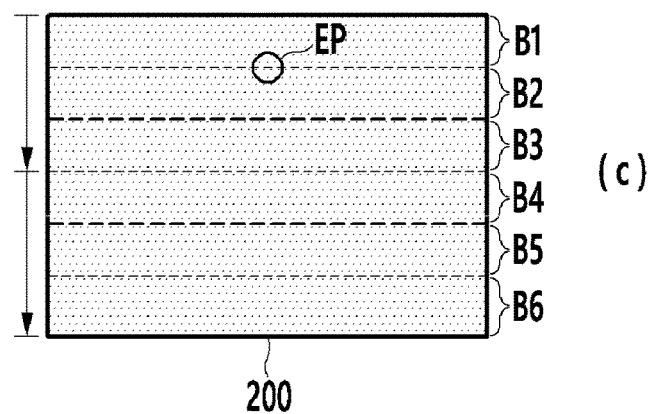

FIG. 14 shows a scanning method of a display unit of FIG. 13 according to various exemplary embodiments.

As shown in FIG. 14 (a), when a motion of the user is sensed, the eye of the user (EP) may be directed to at least one of center blocks B3 and B4 of the display panel 200.

While the eye of the user (EP) is directed to at least one of the center blocks B3 and B4 of the display panel 200, the scan driver 220 may output the scanning signal in the reverse direction from the block B3 to the block B1, and may output the scanning signal in the forward direction from the block B4 to the block B6.

In this instance, the scanning signal may be output from the last scan line (S1$m$) of the block B3, and the scanning signal may be output from the first scan line S21 of the block B4.

As shown in FIG. 14 (b), when a motion of the user is sensed, the eye of the user (EP) may be directed to at least one of the lower blocks B5 and B6 of the display panel 200.

While the eye of the user (EP) is directed to at least one of the lower blocks B5 and B6 of the display panel 200, the scan driver 220 may output the scanning signal in the reverse direction from the block B3 to the block B1, and may output the scanning signal in the reverse direction from the block B6 to the block B4.

In this instance, the scanning signal may be output from the last scan line (S1m) of the block B3, and the scanning signal may be output from the last scan line (S2m) of the block B6.

Finally, as shown in FIG. 14 (c), when a motion of the user is sensed, the eye of the user (EP) may be directed to at least one of the upper blocks B1 and B2 of the display panel 200.

While the eye of the user (EP) is directed to at least one of the upper blocks B1 and B2 of the display panel 200, the scan driver 220 may output the scanning signal in the forward direction from the block B1 to the block B3, and may output the scanning signal in the forward direction from the block B4 to the block B6.

In this instance, the scanning signal may be output from the first scan line S11 of the block B1, and the scanning signal may be output from the first scan line S21 of the block B4.

The display panel 200 may start displaying the image from the region that the eye of the user faces within one frame when the motion of the user is sensed. When a VR image of which time of image changes is displayed to the display unit 451 corresponding to the movement or the rotation of the user, the time until the user views the image after the motion of the user is recognized may be reduced. Therefore, according to an exemplary embodiment, the dizzy feeling of the user who wears the mobile terminal 400 may be reduced.

The controller 180 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the controller 180 and/or one or more components thereof may include or otherwise be associated with one or more memories (not shown) including code (e.g., instructions) configured to cause the controller 180 and/or one or more components thereof to perform one or more of the features, functions, processes, etc., described herein.

The memories, such as memory 170, may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal, comprising:
a display unit comprising
a display panel comprising a plurality of pixels,
a scan driver comprising a plurality of stages connected to at least one of the plurality of pixels and supplying a scanning signal, and
a data driver configured to supply a data voltage to the plurality of pixels;
an eye detecting sensor configured to detect an eye position of a user with respect to the display panel;
a controller configured to generate a control signal that controls the display unit and configured to output the control signal,
wherein the scan driver is configured to supply a scanning signal from a stage corresponding to one region of the display panel where the eye of the user is directed;
the stage is connected to a scan line connected to the at least one pixel,
the display panel is divided into a plurality of regions according to the scan line;
the controller is configured to generate the control signal so that the scan driver supplies a scanning signal to regions excluding at least one region from among the plurality of regions, and
the controller is configured to generate the control signal so as to supply the scanning signal in a reverse direction from a stage corresponding to a lower region when the eye of the user is directed to the lower region from among the plurality of regions.

2. The mobile terminal of claim 1, wherein:
the controller is configured to generate the control signal so as to supply the scanning signal in a forward direction from a stage corresponding to an upper region when the eye of the user is directed to the upper region from among the plurality of regions.

3. A mobile terminal, comprising:
a display unit comprising
a display panel comprising a plurality of pixels,
a scan driver comprising a plurality of stages connected to at least one of the plurality of pixels and supplying a scanning signal, and
a data driver configured to supply a data voltage to the plurality of pixels;
an eye detecting sensor configured to detect an eye position of a user with respect to the display panel;
a controller configured to generate a control signal that controls the display unit and configured to output the control signal,
wherein the scan driver is configured to supply a scanning signal from a stage corresponding to one region of the display panel where the eye of the user is directed;

the stage is connected to a scan line connected to the at least one pixel, the display panel is divided into a plurality of regions according to the scan line;

the controller is configured to generate the control signal so that the scan driver supplies a scanning signal to regions excluding at least one region from among the plurality of regions, and when the eye of the user is directed to a center region from among the plurality of regions, the controller is configured to generate the control signal so as to supply the scanning signal in a forward direction from the stage corresponding to an upper region to a first frame and supply the scanning signal in a reverse direction from the stage corresponding to a lower region to a second frame provided after the first frame.

4. The mobile terminal of claim 3, wherein:

the controller is configured to generate the control signal so that at least one stage from among the stages corresponding to the lower region may not output a scanning signal during the first frame, and at least one stage from among the stages corresponding to the upper region may not output a scanning signal during the second frame.

5. The mobile terminal of claim 1, wherein:

the data driver comprises a first data driver configured to supply a data signal to pixels provided at a first portion comprising at least one region from among the plurality of regions and a second data driver configured to supply a data signal to pixels provided at a second portion comprising at least one region from among the plurality of regions.

6. The mobile terminal of claim 5, wherein:

when the eye of the user is directed to a border region of the first portion and the second portion, the controller is configured to generate the control signal so as to supply a scanning signal in a reverse direction from a stage corresponding to the border region in the first portion and supply a scanning signal in a forward direction from a stage corresponding to the border region in the second portion.

7. The mobile terminal of claim 5, wherein:

when the eye of the user is directed to the first portion, the controller is configured to generate the control signal so as to supply a scanning signal from a stage corresponding to a region where the eye of the user is provided from among the first portion, and supply a scanning signal from a stage corresponding to a region provided nearest the first portion from among the regions in the second portion.

8. The mobile terminal of claim 1, further comprising:

a motion sensor configured to detect a motion of the user, wherein the controller is configured to generate the control signal when the motion of the user is detected.

9. The mobile terminal of claim 8, wherein:

the controller is configured to determine a number of regions where the scan driver supplies the scanning signal according to a motion speed of the user.

10. A method for controlling a mobile terminal comprising a display unit, the method comprising:

detecting an eye of a user with respect to a display panel of the display unit;

determining one region on the display panel where the eye of the user is directed;

generating a control signal that controls the display unit; and outputting the control signal so that a scan driver of the display unit supplies a scanning signal from a stage corresponding to the one region, wherein the display unit comprises:
the display panel comprising a plurality of pixels,
the scan driver comprising a plurality of stages connected to at least one of the plurality of pixels and configured to supply scanning signals,
a data driver configured to supply a data voltage to the plurality of pixels;

wherein the stage is connected to a scan line connected to the at least one pixel, the display panel is divided into a plurality of regions according to the scan line;

the outputting of the control signal comprises generating and outputting the control signal so that the scan driver supplies a scanning signal to the plurality of regions except for at least one region from among the plurality of regions; and the generating and outputting of the control signal further comprises, when the eye of the user is determined to be directed to a lower region from among the plurality of regions, generating and outputting the control signal so as to supply a scanning signal in a reverse direction from a stage corresponding to the lower region.

11. The method of claim 10, wherein:

the generating of the control signal and outputting of the control signal further comprises, when the eye of the user is determined to be directed to an upper region from among the plurality of regions, generating and outputting the control signal so as to supply a scanning signal in a forward direction from a stage corresponding to the upper region.

12. The method of claim 10, wherein:

the generating of the control signal and outputting of the same further comprises, when the eye of the user is determined to be directed to a center region from among the plurality of regions, generating and outputting the control signal so as to supply a scanning signal in a forward direction from a stage corresponding to an upper region to a first frame, and so as to supply a scanning signal in a reverse direction from a stage corresponding to a lower region to a second frame provided after the first frame.

13. The method of claim 10, further comprising:

a motion sensor configured to detect a motion of the user before the detecting an eye position of the user.

14. The method of claim 13, wherein:

the generating of the control signal so that the scan driver supplies a scanning signal to the plurality of regions except for at least one region from among the plurality of regions comprises determining a number of regions where the scan driver supplies the scanning signal according to a motion speed of the user.

* * * * *